United States Patent [19]
Temming

[11] Patent Number: 5,160,019
[45] Date of Patent: Nov. 3, 1992

[54] CARRIER FOR ARTICLES SUCH AS EGGS AND CONVEYING APPARATUS COMPRISING SUCH A CARRIER

[75] Inventor: Leonardus J. Temming, Aalten, Netherlands

[73] Assignee: Staalkat B.V., Aalten, Netherlands

[21] Appl. No.: 734,679

[22] Filed: Jul. 23, 1991

[30] Foreign Application Priority Data

Jul. 24, 1990 [NL] Netherlands .................. 9001682

[51] Int. Cl.$^5$ .............................................. B65G 47/86
[52] U.S. Cl. .......................... 198/803.9; 198/803.7; 198/470.1; 209/510; 209/513; 209/903
[58] Field of Search ............ 198/469.1, 470.1, 474.1, 198/476.1, 803.7, 803.9, 365, 370; 209/510, 513, 514, 903; 294/86.4

[56] References Cited

U.S. PATENT DOCUMENTS

| | | | |
|---|---|---|---|
| 1,935,739 | 11/1933 | Freese | 198/803.7 X |
| 3,023,878 | 3/1962 | Forsthoff et al. | 198/803.7 X |
| 3,370,691 | 2/1968 | Mosterd | 198/433 |
| 3,432,034 | 3/1969 | Mosterd | 209/646 |
| 3,703,309 | 11/1972 | Mosterd | 294/86.4 |
| 4,068,882 | 1/1978 | Van der Schoot | 198/803.7 X |
| 4,117,780 | 4/1989 | Davidsson | 198/476.1 X |
| 4,231,466 | 11/1980 | Rathert | 198/470.1 X |
| 4,488,637 | 12/1984 | Loeffler | 198/803.9 X |
| 4,522,293 | 6/1985 | Van Kattenbroek | 198/470.1 X |
| 4,681,213 | 7/1987 | Winiasz | 198/803.9 |
| 4,921,294 | 5/1990 | Klopfenstein | 198/803.7 X |
| 4,968,081 | 11/1990 | Beight et al. | 198/470.1 X |

FOREIGN PATENT DOCUMENTS

| | | | |
|---|---|---|---|
| 0056882 | 8/1982 | European Pat. Off. | |
| 0114488 | 8/1984 | European Pat. Off. | |
| 1945068 | 3/1971 | Fed. Rep. of Germany | |
| 2332208 | 6/1977 | France | |
| 0098687 | 8/1978 | Japan | 198/803.7 |
| 0066459 | 5/1980 | Japan | 198/803.7 |
| 0225013 | 9/1998 | Japan | 198/474.1 |

*Primary Examiner*—Robert P. Olszewski
*Assistant Examiner*—James R. Bidwell
*Attorney, Agent, or Firm*—Griffin Butler Whisenhunt & Kurtossy

[57] ABSTRACT

The invention relates to a carrier for articles such as fruits, eggs, comprising a frame, two gripper members each having a free end in which an opening is provided for receiving an article between the free ends, the free ends of the gripper being movable relative to each other in such a way that an article can be received between the ends and subsequently released therefrom, wherein one of the gripper members consists of two parts and the two parts are mounted under a spring load on one and the same shaft for pivotal movement relative to each other. The axis of the shaft on which the pivoting gripper member is mounted for pivotal movement, is parallel to the direction of travel of a conveyor, for instance a chain, to which the shaft is connected. The other gripper member is fixedly connected to the conveyor, for instance a chain part. The invention further relates to a conveying apparatus comprising such a carrier.

4 Claims, 4 Drawing Sheets

CARRIER FOR ARTICLES SUCH AS EGGS AND CONVEYING APPARATUS COMPRISING SUCH A CARRIER

This invention relates to a carrier for articles such as eggs, comprising a frame, two hook shaped gripper members each having a free end in which an opening is provided for receiving an article between said free ends, the free ends of the gripper members being movable relative to each other, in such a way that an article can be received between said ends and subsequently released therefrom, as is known from applicant's U.S. Pat. No. 4,068,882.

It is an object of the present invention to simplify this known egg carrier. To that effect, the carrier according the invention is characterized in that one of the gripper members consists of two parts and these parts are mounted under a spring load on one and the same shaft for pivotal movement relative to each other. The axis of the shaft on which the pivoting gripper member is mounted for pivotal movement, is parallel to the direction of travel of a conveying means, for instance a chain, to which the shaft is connected. The other gripper member is fixedly connected to the conveying means, for instance a chain part. Thus, there is obtained an apparatus with few parts, which is very simple to fabricate. Because only one of the two gripper members is movable relative to the chain, the carrier is less susceptible to malfunction.

In further elaboration of the invention, the movable gripper member may be formed with an extension in upward direction and fitted with means cooperating with control members. The extension referred to may for instance be fitted with a rotatable roller adapted to cooperate with a guide arranged above the path of the conveyor chain. Further, the egg carrier may consist of a frame comprising a shaft on which the two-part movable gripper member is mounted for pivotal movement. Both parts, having a spring interposed between them, are pivotable about said shaft, while one of the two parts is further provided at the top thereof with means for cooperation with a guide arranged above the path of the carrier.

The construction described has a great number of advantages; in addition to the fact that only one moving gripper member is present, there are no mechanically driven means required for opening the holder. By removing the guide, a very ready release of the article can be obtained.

The construction of the gripper members can be adjusted to the shape of the product, permitting articles to be received with their axis in horizontal as well as in vertical orientation.

The invention further relates to a conveying apparatus comprising carriers as described above, which apparatus is characterized in that above the path of the carriers a guide is arranged and parts of the guide are adapted to be moved.

Two embodiments of the egg carrier according to the invention will now be explained, by way of example, with reference to the accompanying drawings, in which.

Figure 3:
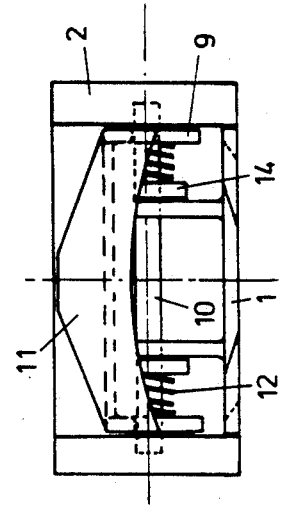
FIG. 3 is a bottom view of the apparatus according to FIG. 2.

Referring to the drawings, the egg carrier according to the invention comprises a fixed gripper member 1, forming an integral part of a mounting frame 2. The mounting frame is mounted between shafts 4 of a chain conveyor 5 by means of spronging snap members 3. The chain conveyor 5 itself is mounted on a machine frame 8 by means of rollers 6 guided by guides 7.

In addition to said fixed gripper member 1, the carrier comprises a pivoting gripper member 9 which is pivoted to a shaft 10 mounted in mounting frame 2.

The pivoting gripper member 9 comprises a guiding tab 11 causing the gripper member 9 to move sideways when slidingly engaged by an article, the carrier being thereby opened. For slidingly inserting an article, there is provided a lifting mechanism 20 whose direction of travel is indicated by an arrow. Chain-dotted lines indicate the position of the lifting mechanism 20 and the parts of the egg carrier when receiving an article, in this case an egg 21. As can be seen clearly from FIG. 1, upon sliding insertion of an article, the pivoting gripper member 9 will move sideways.

By providing a spring 12, in the inoperative position, a stop 13 of one part of the pivoting gripper member 9 will invariably abut against a control yoke 14.

The control yoke 14, which can also pivot about the shaft 10, comprises a guide roller 15 which is in continuous contact with a fixed guide 16 or detachable guide members 17, which are directly or indirectly mounted on the frame 8.

The guide member 17 is operated by a magnet 18 and can be moved in the direction indicated by an arrow, i.e. upon excitation of the magnet 18, the guide member 17 moves up and the yoke 14, under the influence of the force of the spring 12, pivots to the right into the position indicated by chain-dotted lines, with the result that the force exerted by the spring 12 on the pivoting gripper member 9 is removed, so that the gripper member, under the influence of the weight of the article, is moved into the position indicated by dotted lines, thus releasing the article.

Figure 2:
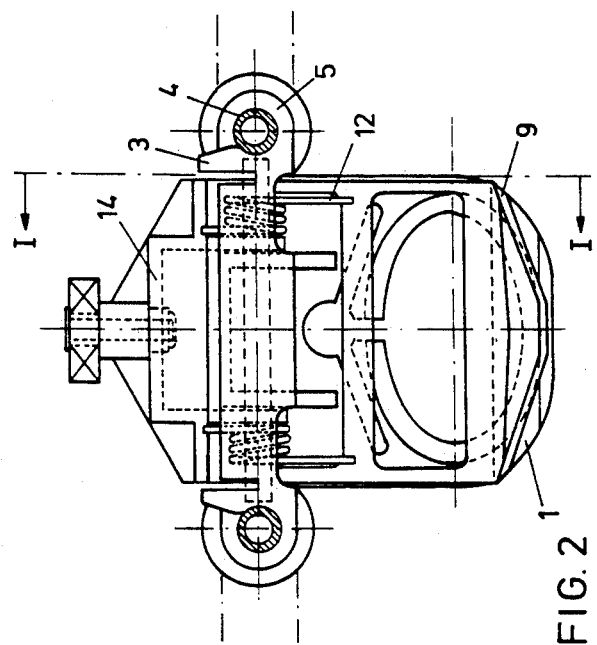
FIG. 2 is a diagrammatic side elevation of the apparatus according to the invention as shown in FIG. 1, with omission of some parts.
Figure 1:
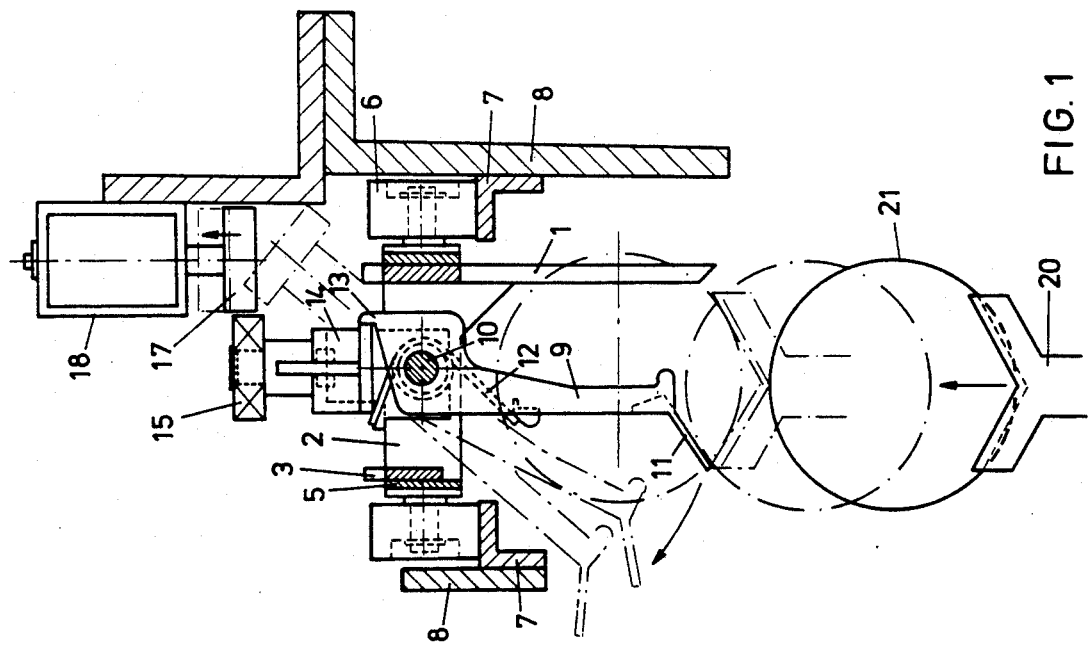
FIG. 1 is a diagrammatic cross section taken on the line I—I of FIG. 2, of a first embodiment of the egg carrier according to the invention.
Figure 4:
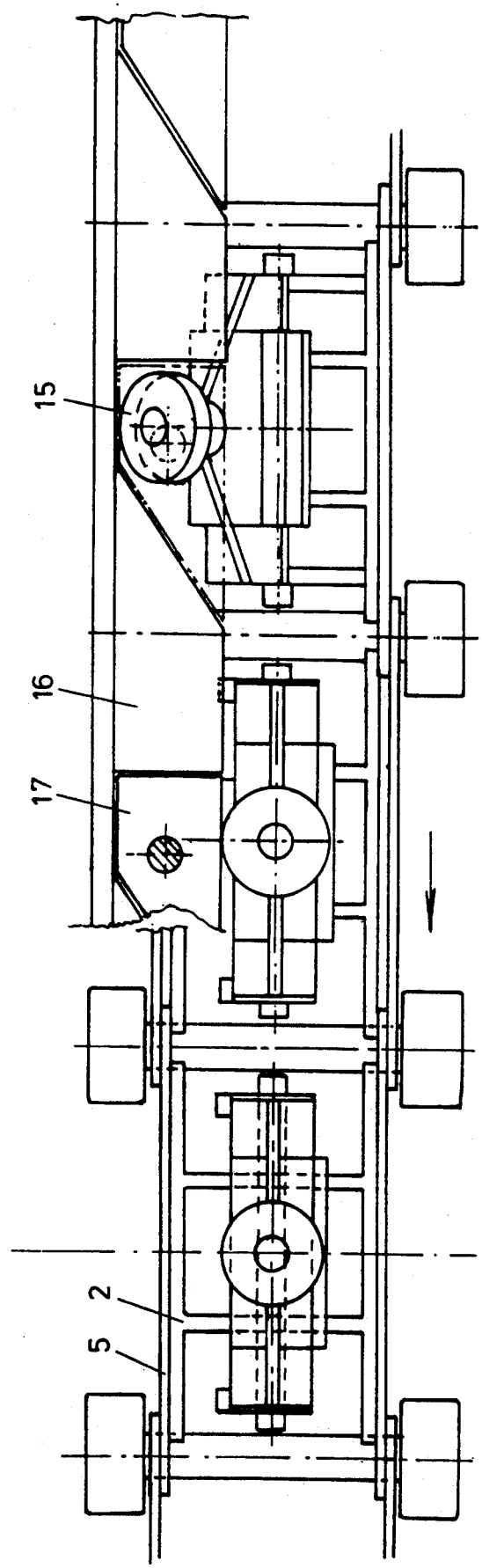
FIG. 4 is a top plan view of the apparatus according to FIG. 1.
Figure 6:
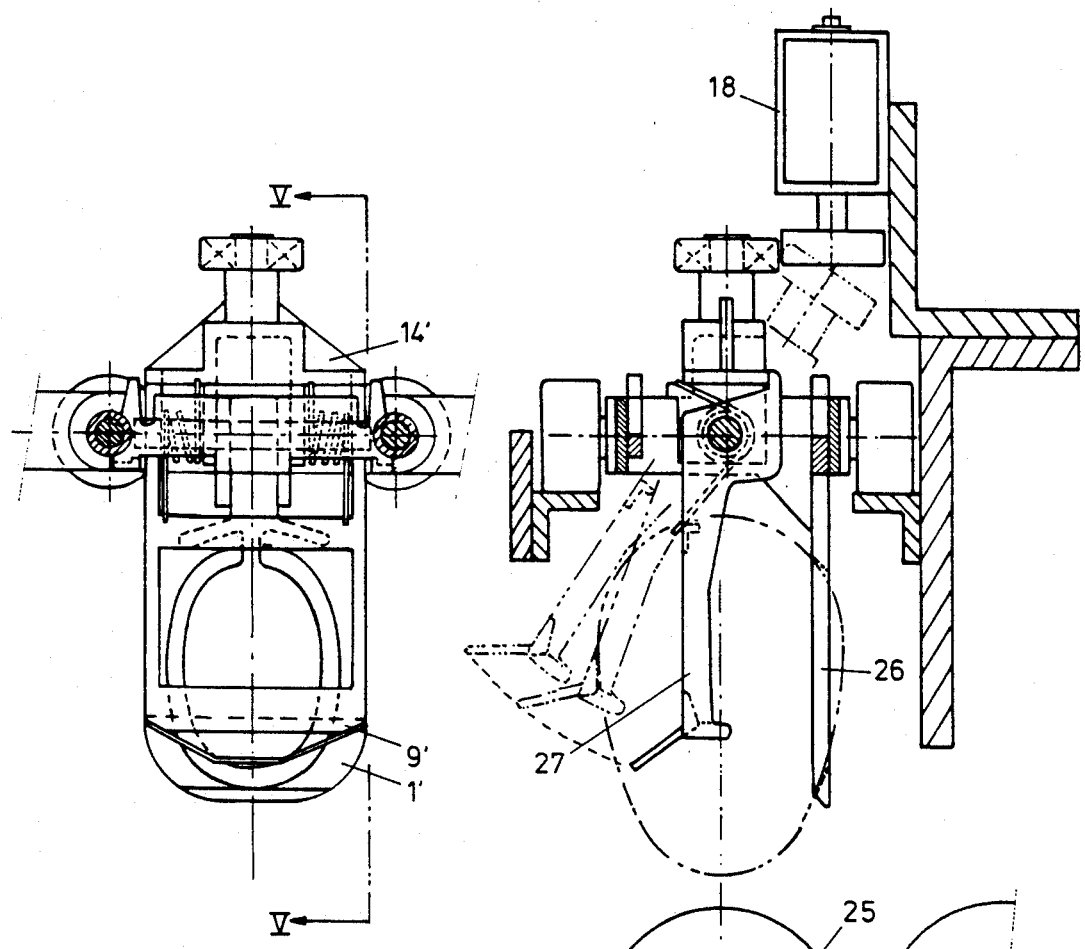
FIG. 6 is an elevation similar to FIG. 2 of the apparatus shown in FIG. 5.
Figure 5:
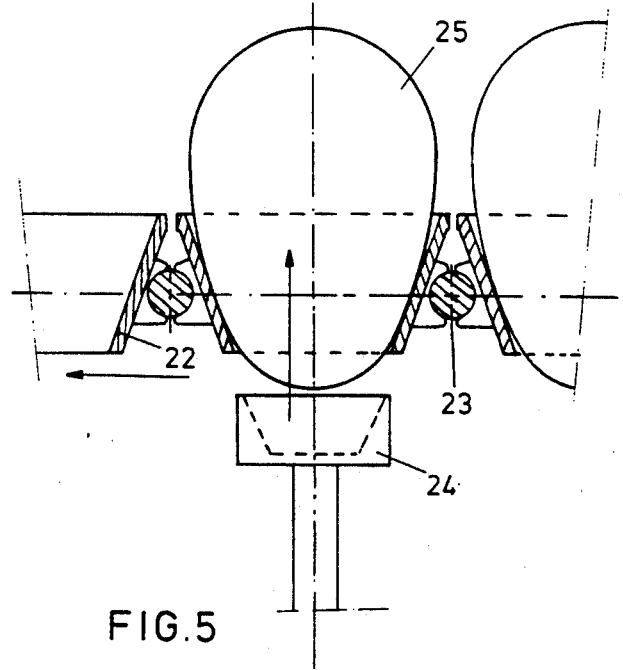
FIG. 5 is a section taken on the line V—V of FIG. 6 at an inserting station.

While in the apparatus according to FIG. 1 the eggs are supplied on the lifting mechanism with their axes in substantially horizontal orientation and, so oriented, are carried into the egg carrier, in the egg carrier according to FIGS. 5 and 6, which is otherwise completely identical to the egg carrier according to FIGS. 1-3, the articles—in this case, eggs—are supplied with their axes in vertical orientation by means of chain 23 equipped with conical holders 22. Arranged under the chain is a lifting mechanism 24 which moves the eggs 25 upwards in the direction indicated by an arrow into the carriers, in this case consisting of a fixed gripper member 26 and a movable gripper member 27.

Figure 7:
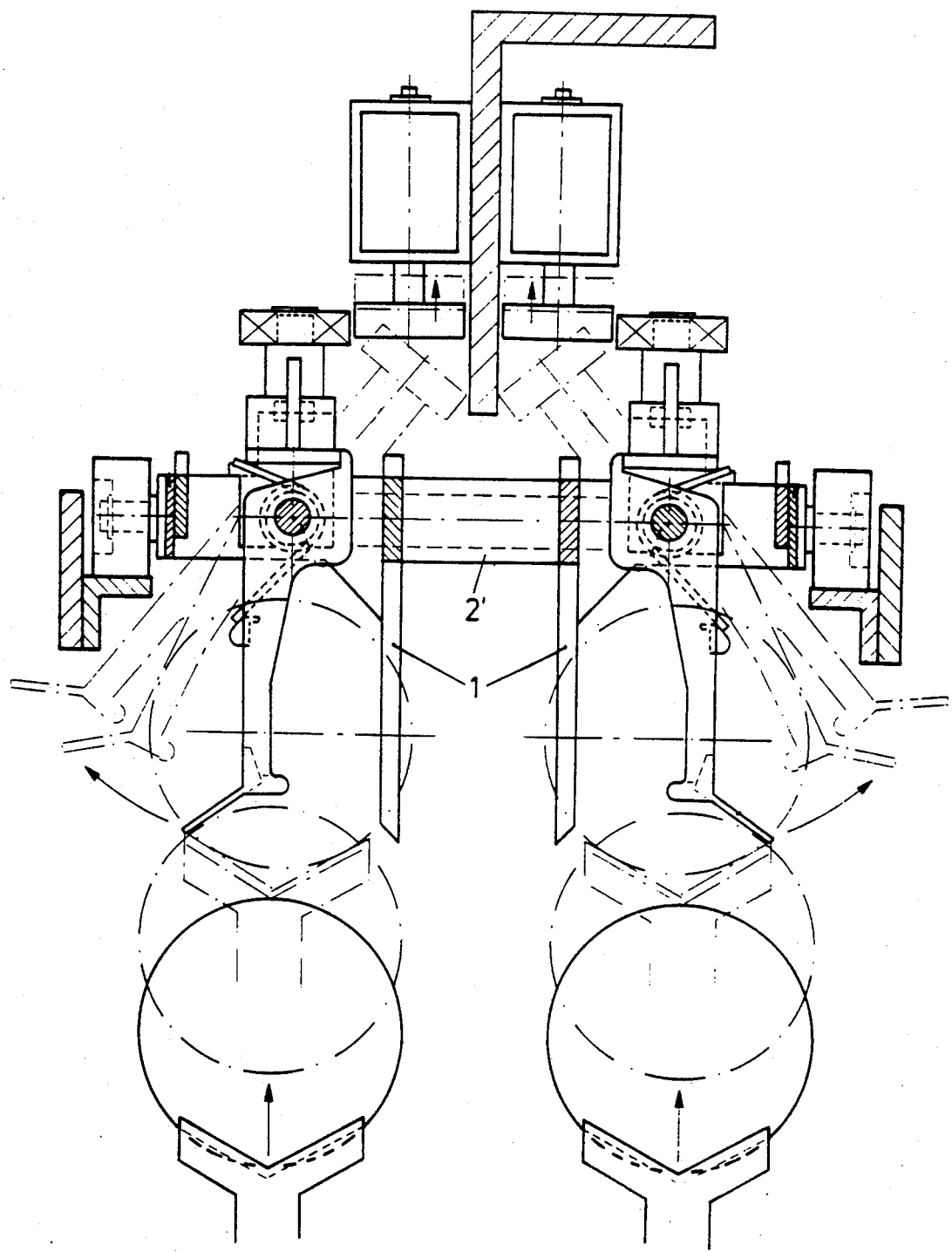
FIG. 7 is an elevation similar to FIG. 1 of a second embodiment of the egg carrier according to the invention.

FIG. 7, finally, shows a third embodiment of the egg carrier according to the invention. Basically, this embodiment concerns a double design of the apparatus according to FIG. 1. As the parts of the apparatus shown in FIG. 7 are practically identical to those shown in FIG. 1 and described hereinabove, this embodiment will not be discussed in detail, except that it is noted that in this double design, the fixed gripper members of the two grippers mounted on one yoke 2' are arranged back-to-back, in other words, the movable gripper members are in mirrored relationship relative to each other, so that there is sufficient space for them to make a lateral movement.

After the foregoing, it will be clear that within the framework of the invention, a great number of modifications are possible.

I claim:

1. A carrier for articles, such as fruits and eggs, comprising:
   a frame;
   two gripper members mounted on the frame, with each having a free end so as to provide an opening for receiving an article between the free ends;
   one gripper member being fixedly connected to the frame to provide a fixed gripper member and the other gripper member being pivotable relative to the fixed gripper member such as to provide a pivotable gripper member and such that an article can be received between the free ends and subsequently released therefrom;
   the pivotable gripper member having two parts, both of which are mounted with a spring on a single shaft such that the two parts are pivotal relative to each other; and
   the free end of said pivotable gripper member being provided with an oblique tab on an article feed-in side thereof for opening said pivotable gripper member when the article is received thereby.

2. A carrier according to claim 1 wherein the shaft is connected to the frame and an axis of the shaft, about which the pivotable gripper member is movable, is parallel to the direction of travel of the frame.

3. A carrier according to claim 2 wherein an upper part of the two parts of said pivotable gripper member is provided with means adapted to cooperate with guide means disposed above and sidewardly of the path of travel of said frame.

4. A conveying apparatus comprising a plurality of carriers according to claim 1 wherein the carriers are connected to a conveying means and guide means are disposed above the path of travel of the conveying means such that parts thereof are movable by a magnet disposed at an article releasing location.

* * * * *